INVENTOR
RICHARD W. ANDERSON
BY
A. C. Smith
ATTORNEY

United States Patent Office 3,252,106

Patented May 17, 1966

3,252,106
COAXIAL LINE PHASE DETECTOR FOR AUTOMATIC FREQUENCY CONTROL SYSTEM

Richard W. Anderson, Los Altos, Calif., assignor to Hewlett-Packard Company, Palo Alto, Calif., a corporation of California Filed May 5, 1964, Ser. No. 365,065
4 Claims. (Cl. 331—9)

This invention relates to apparatus for producing an output signal related to the phase relationship between applied high frequency signals.

It is an object of the present invention to provide a phase detector which operates at frequencies of the order of several kilomegacycles per second.

It is another object of the present invention to provide a phase detector which produces an output having an amplitude related to the phase relationship between applied signals.

It is still another object of the present invention to provide a sampling-type phase detector which operates at very high frequencies.

In accordance with the illustrated embodiment of the present invention a step-recovery junction diode is connected in a transmission line to receive an applied signal for producing narrow pulses at the repetition rate of the applied signal. Another signal is coupled to the transmission line through a directional coupler. The combination of the pulses and signal on the transmission line are applied to a back-biased crystal detector which is rendered conductive only when the amplitude of the combination of the pulses and signal is larger than the detector bias. The amplitude of the detector output is thus related to the position on the waveform of the signal at which the pulse is combined, and hence is related to the phase relationship between the two applied signals.

Figure 1:
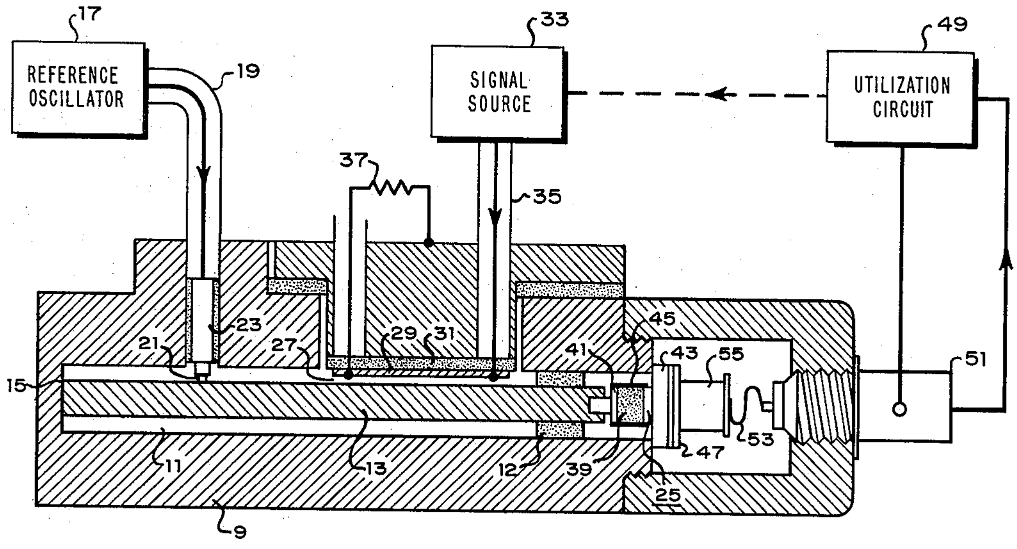
Figure 2:
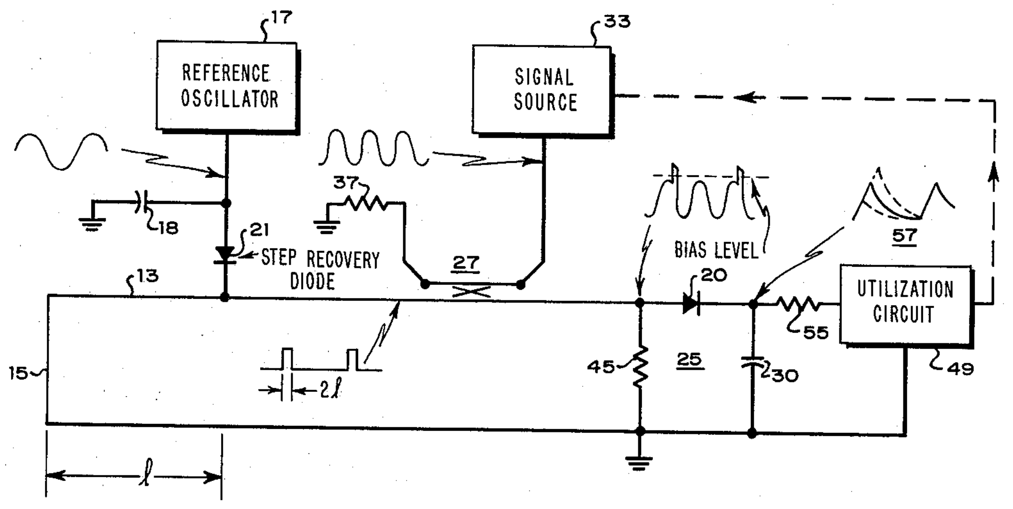

Other and incidental objects of the present invention will be apparent from a reading of this specification and an inspection of the accompanying drawing in which:

FIGURE 1 is a simplified cross-sectional view of the phase-detector apparatus of the present invention; and FIGURE 2 is a schematic diagram of the apparatus of FIGURE 1.

Referring now to the drawing, there is shown in FIGURE 1 a transmission line formed by the body 9 having a central bore 11 and a conductor 13 having a grounded end 15 coaxially disposed within the bore. Insulator 12 supports conductor 13 within the bore 11. Signal from reference oscillator 17 is applied through the conductors of cable 19 to a step-recovery diode 21 which is held in contact with conductor 13 by suitable means including mounting post 23. The capacitor 18 shown in FIGURE 2 which is formed by the post 23 and the body 9 filters out high frequency signal and prevents it from returning to oscillator 17. The step-recovery diode 21 shows a rapid change in reverse conductivity in response to the depletion of carriers which are stored in the region of the junction of the diode during forward conduction of current. This rapid change in reverse conductivity during a half cycle of signal from reference oscillator 17 establishes a sharp wave front which propagates in opposite directions along the transmission line formed by body 9 and conductor 13. The wave front which arrives at shorted end 15 is reflected back toward diode 21 and thus terminates the wave propagating to the right. This produces a very narrow pulse on conductor 13 having a width which is twice the propagation time of the transmission line between diode 21 and end 15. These pulses propagate along the conductor 13 toward the crystal detector 25. A directional coupler 27 is formed by the conductor 29 mounted away from conductor 13 on an insulator 31. Signal from source 33 applied to conductor 29 through the cable 35 is directed toward the detector 25 and is combined on conductor 13 with the narrow pulses appearing thereon. Resistor 37 is the terminating load for the directional coupler and is typically disposed within the body 9.

The detector 25 includes an insulator 39 attached between end pieces 41 and 43 and a resistive film 45 disposed on the outer surface of the insulator in contact with the end pieces. This resistive film matches the characteristic impedance of the transmission line and thus prevents reflections. A semiconductor diode 20 is disposed within the insulator in contact with the end piece 41 and cap 47 which is insulated from end piece 43. This diode is back biased below the level of signal from source 33 alone and below the level of the pulses alone by the utilization circuit 49 connected to the diode through connector 51, spring 53 and damping resistor 55. The damping resistor 55 reduces oscillations in the output. The back bias is overcome and the diode is rendered conductive by the combination of the signal from source 33 and the narrow pulses appearing on the transmission line. Charge is supplied to the capacitor 30 formed by cap 47 insulated from end piece 43 during the time that the diode 20 is conductive. The circuit equivalent of the detector 25 connected to the end of the transmission line is shown in FIGURE 2. The amplitude of the combined sinusoid and pulse is determined by the position on the sinusoid at which the pulse is added (i.e. the phase angle between the pulses and sinusoidal signal). Thus, the charge on the capacitor 30, and hence the voltage at the output is related to the phase angle between the signals applied to the present apparatus from oscillator 17 and source 33. This output voltage 57 having a shape as shown in FIGURE 2, is received by the utilization circuit 49 which may, in turn, control the frequency of source 33 to maintain phase lock between a harmonic of the signal from source 33 and the signal from reference oscillator 17.

I claim:

1. Signalling apparatus comprising:
a transmission line having a common conductor and another conductor and having a shorted end and another end;
a step-recovery diode connected to said other conductor at a point intermediate the shorted end and the other end of said transmission line;
means connected to said step-recovery diode for supplying a first signal to said line;
means disposed along said line for coupling a second signal thereto; and
detector means disposed at said other end of the line for receiving signal appearing thereon;
said detector means producing an output in response to the combination of the first and second signals appearing at said other end of the line exceeding a predetermined level.

2. Signalling apparatus comprising:
a transmission line having a common conductor and another conductor and having a shorted end and another end;
a step-recovery diode connected to said other conductor at a point intermediate the shorted end and the other end of said transmission line;
first and second signal sources;
means including the step-recovery diode connected to the first source for alternately supplying forward and reverse conduction current through said diode to the conductors of the transmission line, said diode showing a rapid change in conductivity during conduction of reverse current therethrough;
signal coupling means disposed along said line and connected to said second source for supplying the signal therefrom to said transmission line; and detector means connected at said other end of the line for receiving signal appearing thereon;

said detector means producing an output in response to the combination of signals appearing at said other end of the line exceeding a selected level which is larger than the level of one of the signals from the first and second sources.

3. Apparatus as in claim 2 wherein:

the amplitude of said output is related to the excess over the selected level of the combination of signals appearing at said other end of the line.

4. Signalling apparatus comprising:

a transmission line having a common conductor and another conductor and having a shorted end and another end;

a step-recovery diode connected to said other conductor at a point intermediate the shorted end and the other end of said transmission line;

a reference signal source;

a variable-frequency signal source for producing a signal having a frequency related to a control signal applied thereto;

means including the step-recovery diode connected to the reference signal source for alternately supplying forward and reverse conduction current through said diode to the conductors of the transmission line, said diode showing a rapid change in conductivity during conduction of reverse current therethrough;

signal coupling means disposed along said line and connected to said variable-frequency signal source for supplying the signal therefrom to said transmission line;

detector means connected at said other end of the line for receiving signal appearing thereon;

said detector means producing an output in response to the combination of signals appearing at said other end of the line exceeding a selected level which is larger than the level of the variable-frequency signal; and a utilization circuit connected to receive said output for supplying a control signal to said variable-frequency signal source which is related to the amplitude of said output;

whereby phase lock is established between the signal from the reference source and the signal from the variable-frequency source.

No references cited.

ROY LAKE, *Primary Examiner*.

S. H. GRIM, *Assistant Examiner*.